US011783344B2

(12) United States Patent
Scholl

(10) Patent No.: US 11,783,344 B2
(45) Date of Patent: Oct. 10, 2023

(54) SYSTEM AND METHODS FOR OBTAINING REAL-TIME CARDHOLDER AUTHENTICATION OF A PAYMENT TRANSACTION

(71) Applicant: Mastercard International Incorporated, Purchase, NY (US)

(72) Inventor: Christopher T. Scholl, Saint Peter's, MO (US)

(73) Assignee: Mastercard International Incorporated, Purchase, NY (US)

( * ) Notice: Subject to any disclaimer, the term of this patent is extended or adjusted under 35 U.S.C. 154(b) by 611 days.

(21) Appl. No.: 16/110,558

(22) Filed: Aug. 23, 2018

(65) Prior Publication Data

US 2020/0065820 A1 Feb. 27, 2020

(51) Int. Cl.
*G06Q 20/40* (2012.01)
*G06Q 20/38* (2012.01)

(52) U.S. Cl.
CPC ..... *G06Q 20/4093* (2013.01); *G06Q 20/3823* (2013.01); *G06Q 20/4012* (2013.01); *G06Q 20/40145* (2013.01)

(58) Field of Classification Search
CPC ....... G06Q 20/40–4018; G06Q 20/405–40975
See application file for complete search history.

(56) References Cited

U.S. PATENT DOCUMENTS

| | | | |
|---|---|---|---|
| 7,566,002 B2 | 7/2009 | Love et al. | |
| 11,361,300 B1* | 6/2022 | Kurani | G06Q 20/4012 |
| 2006/0015463 A1* | 1/2006 | Gupta | G06Q 20/382 |
| | | | 705/52 |
| 2007/0022058 A1* | 1/2007 | Labrou | G06Q 20/322 |
| | | | 705/67 |
| 2012/0166334 A1 | 6/2012 | Kimberg et al. | |
| 2015/0012429 A1* | 1/2015 | DiMuro | G07F 7/0853 |
| | | | 705/41 |
| 2016/0117682 A1* | 4/2016 | Srinath | G06Q 20/40145 |
| | | | 705/44 |
| 2016/0364730 A1* | 12/2016 | Rans | G06Q 20/341 |
| 2017/0024719 A1* | 1/2017 | Finch | G06Q 20/401 |

(Continued)

*Primary Examiner* — Jay Huang
(74) *Attorney, Agent, or Firm* — Hovey Williams LLP

(57) ABSTRACT

A secondary authentication system and computer-implemented method for obtaining real-time cardholder authentication of a payment transaction associated with a cardholder's payment card includes a memory device for storing data and a processor communicatively coupled to the memory device. The processor is programmed to receive a payment authorization request message including a primary account number corresponding to a payment account of the cardholder for funding the payment transaction. In addition, the processor is programmed to determine whether the payment account requires secondary authentication by the cardholder for the payment transaction, and if, based on the determination, the payment account requires secondary authentication of the payment transaction, place the payment transaction on hold. Furthermore, the processor is programed to identify a mobile device associated with the payment account of the cardholder, transmit an authentication request message to the identified mobile device, and receive, from the mobile device, an authentication response message.

15 Claims, 10 Drawing Sheets

(56) References Cited

U.S. PATENT DOCUMENTS

2017/0061441 A1\* 3/2017 Kamal ................. G06Q 20/326
2017/0186005 A1\* 6/2017 Vaidya ................. G06Q 20/405
2017/0364919 A1\* 12/2017 Ranganath ............. G06Q 20/20

\* cited by examiner

SYSTEM AND METHODS FOR OBTAINING REAL-TIME CARDHOLDER AUTHENTICATION OF A PAYMENT TRANSACTION

FIELD OF THE DISCLOSURE

The field of the disclosure relates generally to systems and methods for obtaining secondary authentication of payments transactions and, more particularly, to systems and methods for obtaining real-time cardholder authentication of a payment transaction utilizing a cardholder's mobile device.

BACKGROUND OF THE DISCLOSURE

In recent years, the use of payment cards and other cash-substitute payment instruments associated with transaction accounts has increased. Accompanying the increase in use of such payment means is a rise in fraudulent transaction attempts, many of which are successful as fraud detection methods often err on the side of approving a transaction to minimize declines to cardholders.

During a payment transaction using a payment card (e.g., a credit, debit, or stored value card), it is important to verify a cardholder's ownership of an account to avoid a variety of problems, such as fraudulent or unauthorized use. Payer authentication is the process of verifying a cardholder's ownership of an account. The most common method to authenticate a card holder's ownership of an account occurs routinely at a point of sale during what is called a "card present transaction." A card present transaction involves a merchant's representative taking the cardholder's card, swiping it though a payment card terminal to verify account status and credit line availability, and then checking to see that the signature on the back of the card matches the purchaser's signature. Comparison of the signatures provides authentication of account ownership. However, often, the comparison is not completed by the merchant, which can lead to fraud. Another common method includes the cardholder swiping or dipping the card at a point-of-sale terminal and inputting a PIN to authenticate the cardholder. However, a fraudster may know a cardholder's PIN, thereby allowing fraudulent purchases to be made. Known fraud detection systems do not identify most fraudulent uses where the cardholder is not authenticated by the merchant or where the cardholder inputs a PIN.

In view of the foregoing, a system for providing additional authentication of a transaction by the cardholder would be desirable. Such a secondary authenticating system should be relatively easy to implement and use, require a minimal investment of resources, and provide a high level of interoperability between the system's participants.

SUMMARY OF THE DISCLOSURE

This summary is not intended to identify essential features of the present invention and is not intended to be used to limit the scope of the claims. These and other aspects of the present invention are described below in greater detail.

In one aspect, a secondary authentication system is provided. The secondary authentication system is configured for obtaining real-time cardholder authentication of a payment transaction associated with a cardholder's payment card. The secondary authentication system includes a memory device for storing data and a processor communicatively coupled to the memory device. The processor is programmed to receive a payment authorization request message including a primary account number corresponding to a payment account of the cardholder for funding the payment transaction. The processor is also programmed to determine whether the payment account requires secondary authentication by the cardholder for the payment transaction. If, based on the determination, the payment account requires secondary authentication of the payment transaction, the processor is programmed to place the payment transaction on hold. Moreover, the processor is programmed to identify a mobile device associated with the payment account of the cardholder, transmit an authentication request message to the identified mobile device, and receive from the mobile device an authentication response message.

In another aspect, a method for obtaining real-time cardholder authentication of a payment transaction associated with a cardholder's payment card is provided. The method includes receiving, from a point-of-sale terminal, a payment authorization request message including a primary account number corresponding to a payment account of the cardholder for funding the payment transaction. The method also includes determining whether the payment account requires secondary authentication of the payment transaction by the cardholder. Furthermore, the method includes placing the payment transaction on hold if, based on the determination, the payment account requires secondary authentication of the payment transaction. Moreover, the method includes identifying a mobile device associated with the payment account of the cardholder, transmitting an authentication request message to the identified mobile device, and receiving from the mobile device an authentication response message.

In yet another aspect, a method for real-time cardholder authentication of a payment transaction based on geolocation is provided. The method includes receiving, from a point-of-sale terminal, a payment authorization request message including a primary account number corresponding to a payment account of a cardholder and location data corresponding to the point-of-sale terminal's physical location. The method also includes identifying the point-of-sale terminal's physical location based on the location data included in the payment authorization request message, and identifying a location of a mobile device of the cardholder. The mobile device includes a secondary authentication application configured to provide the location of the mobile device. Furthermore, the method includes comparing the identified location of the mobile device to the identified physical location of the point-of-sale terminal. In addition, the method includes determining whether the payment account requires secondary authentication of the payment transaction by the cardholder, and placing the payment transaction on hold if, based on the determination, the payment account requires secondary authentication of the payment transaction. Further, the method includes transmitting an authentication request message to the mobile device and determining that a difference between the identified location of the mobile device and the identified physical location of point-of-sale terminal is below a predefined threshold distance. The method also includes monitoring the difference until it exceeds the predetermined threshold, and upon the difference exceeding the predetermined threshold, determining whether an authentication response message was received from the mobile device. If the authentication response message was not received from the mobile device, the method includes populating a field of the payment authorization request message with a decline code. Moreover, the method includes transmitting the payment authorization request message to an acquirer as a payment authorization response message.

BRIEF DESCRIPTION OF THE DRAWINGS

Embodiments of the present invention are described in detail below with reference to the attached drawing figures, wherein.

The figures are not intended to limit the present invention to the specific embodiments they depict. The drawings are not necessarily to scale. Like numbers in the Figures indicate the same or functionally similar components.

DETAILED DESCRIPTION OF THE DISCLOSURE

Figure 1:
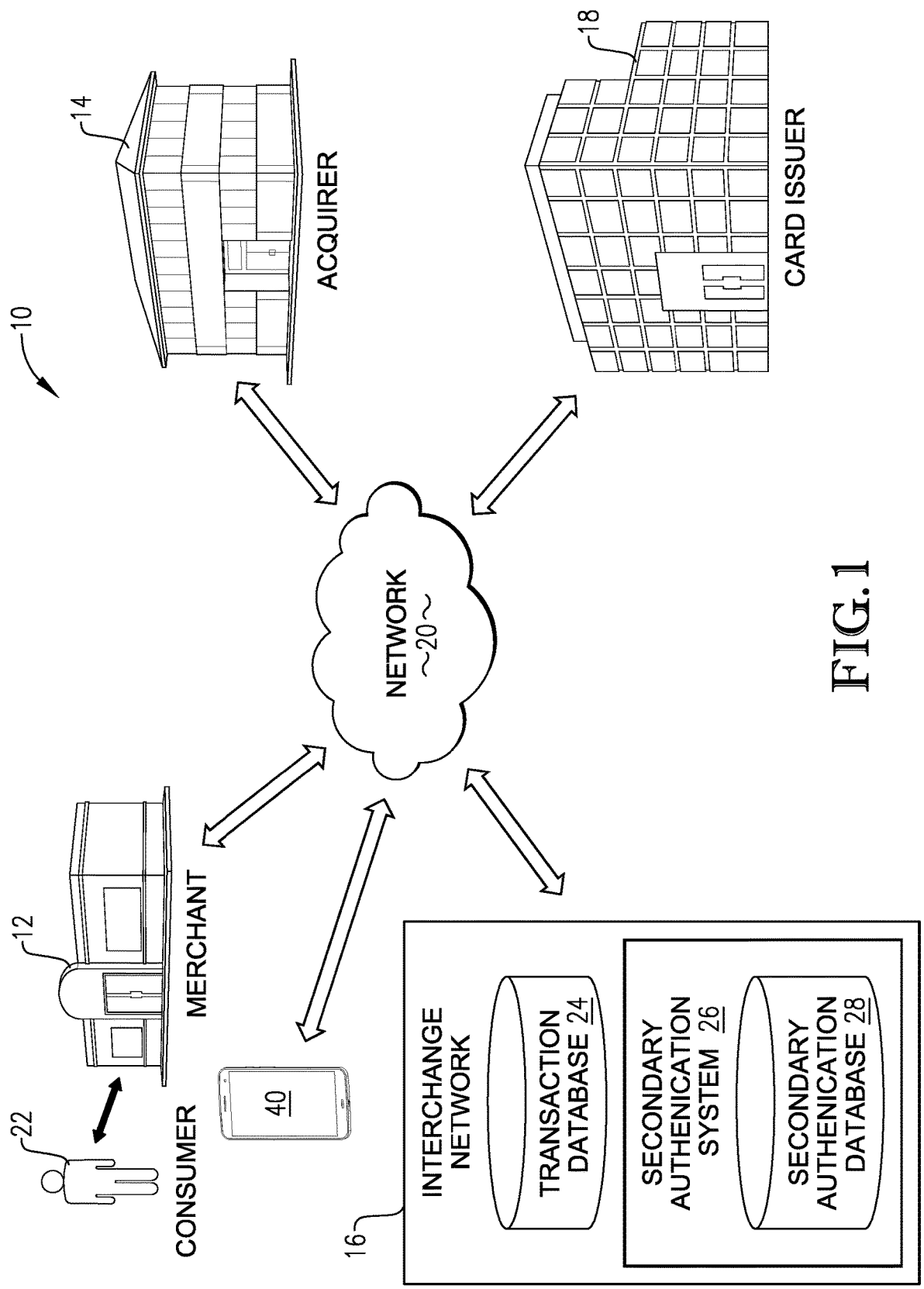
FIG. 1 is a block diagram of an example multi-party payment card network system having a secondary authentication (SA) system.

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. It is contemplated that the invention has general application to identifying and verifying entities requesting access to confidential information and/or financial services. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment." "an embodiment," or "embodiments" in this description do not necessarily refer to the same embodiment and are not mutually exclusive unless so stated. Specifically, a feature, component, action, operation, etc. described in one embodiment may also be included in other embodiments but is not necessarily included. Thus, particular implementations of the present invention can include a variety of combinations and/or integrations of the embodiments described herein.

Broadly characterized, the present invention relates to systems and methods for obtaining real-time cardholder authentication of payment transactions associated with a cardholder's payment card. More particularly, the disclosed embodiments provide a system and computer-implemented method for intercepting a payment authorization request message from a merchant before the message is transmitted to the issuing bank for approval and requesting additional authentication from the cardholder before processing the transaction. In one example embodiment, a secondary authentication component is configured for use with a payment card processing network such as, for example, an interchange network. The secondary authentication component includes a memory device and a processor programmed to communicate with the interchange network to receive transaction data from a merchant, including the payment authorization request message. The transaction data may include, for example, data identifying the geographic location of the merchant point-of-sale (POS) terminal used to transmit the payment authorization requests message. The secondary authentication component identifies the primary account number (PAN) associated with the payment authorization request message and determines whether the cardholder has requested that additional authentication of the transaction is required. If additional authentication is required, the secondary authentication component may place a hold on the payment authorization request message and transmit an authentication request message to a mobile device of the cardholder. The secondary authentication component may release the payment authorization request message for processing upon receipt of authentication from the cardholder or may transmit a payment authorization response message to the merchant indicating that the transaction is declined.

FIG. 1 is a block diagram of an example multi-party payment card network system 10 having a secondary authentication (SA) component 26 (broadly, a secondary authentication system). As used herein, the term "component" includes software or hardware particularly programmed to receive input, perform one or more processes as described herein using the input, and provide an output resulting from the performance of the one or more processes. The input, output, and processes performed by various components will be apparent to one skilled in the art based on the present disclosure.

In the exemplary embodiment, the payment card network system 10 facilitates providing interchange network services offered by an interchange network 16. In addition, the payment card network system 10 enables payment card transactions in which merchants 12, acquirers 14, and/or issuers 18 do not need to have a one-to-one relationship. Although parts of the payment card network system 10 are presented in one arrangement, other embodiments may include the same or different parts arranged otherwise, depending, for example, on authorization processes for purchase transactions, communication between computing devices, etc.

As used herein, the phrase "payment card network" or "interchange network" includes a system or network used for the transfer of funds between two or more parties using cash-substitutes. Transactions performed via a payment card network may include, for example, goods and/or service purchases, credit purchases, debit transactions, fund transfers, account withdrawals, and the like. Payment card networks may be configured to perform such transactions using cash-substitutes including, for example, and without limitation, payment cards, checks, financial accounts, and the like. The phrases payment card network and/or interchange network may include the payment card network as an entity, and the physical payment card network, such as the equipment, hardware, and software making up the network.

In the example embodiment, the payment card network system 10 generally includes the merchants 12, the acquirers 14, the interchange network 16, and the issuers 18, coupled together in communication via a network 20. The network 20 includes, for example and without limitation, one or more of a local area network (LAN), a wide area network (WAN) (e.g., the Internet, etc.), a mobile network, a virtual network, and/or any other suitable public and/or private network capable of facilitating communication among the merchants 12, the acquirers 14, the interchange network 16, and/or the issuers 18. In some embodiments, the network 20 may include more than one type of network, such as a private payment transaction network provided by the interchange network 16 to the acquirers 14 and the issuers 18 and, separately, the public Internet, which may facilitate communication between the merchants 12, the interchange network 16, the acquirers 14, and consumers 22, etc.

Embodiments described herein may relate to a transaction card system, such as a credit card payment system using the Mastercard® interchange network. (Mastercard is a registered trademark of Mastercard International Incorporated) The Mastercard interchange network is a set of proprietary communications standards promulgated by Mastercard international incorporated for the exchange of financial transaction data and the settlement of funds between financial institutions that are members of Mastercard International Incorporated. As used herein, financial transaction data includes a unique account number (e.g., a PAN) associated with an account holder or consumer 22 using a payment card issued by an issuer, purchase data representing a purchase made by the cardholder, including a type of merchant, amount of purchase, date of purchase, and other data, which may be transmitted between any parties of the multi-party payment card network system 10.

In a typical transaction card system, a financial institution called the "issuer" issues a payment card, such as a credit card, to a cardholder or consumer 22, who uses the payment card to tender payment for a purchase from the merchant 12. In the example embodiment, the merchant 12 is typically associated with products, for example, and without limitation, goods and/or services, that are offered for sale and are sold to the consumers 22. The merchant 12 includes, for example, a physical location and/or a virtual location. A physical location includes, for example, a brick-and-mortar store, etc., and a virtual location includes, for example, an Internet-based store-front.

To accept payment with the payment card, the merchant 12 must normally establish an account with a financial institution that is part of the payment card network system 10. This financial institution is usually called the "merchant bank," the "acquiring bank," or the acquirer 14. When the cardholder 22 tenders payment for a purchase with a payment card, the merchant 12 requests authorization from the acquirer 14 for the amount of the purchase. The request may be performed over the telephone but is usually performed through the use of a point-of-sale terminal that reads the cardholder's account information from a magnetic stripe, a chip, or embossed characters on the payment card and communicates electronically with the transaction processing computers of the acquirer 14. Alternatively, the acquirer 14 may authorize a third party to perform transaction processing on its behalf. In this case, the point-of-sale terminal will be configured to communicate with the third party. Such a third party is usually called a "merchant processor," an "acquiring processor," or a "third party processor."

Using the interchange network 16, computers of the acquirer 14 or merchant processor will communicate with computers of the issuer 18 to determine whether the cardholder's account is in good standing and whether the purchase is covered by the cardholder's available credit line. Based on these determinations, the request for authorization will be declined or accepted. If the request is accepted, an authorization code is issued to the merchant 12.

When a request for authorization is accepted, the available credit line of the cardholder's account is decreased. Normally, a charge for a payment card transaction is not posted immediately to the cardholder's account because bankcard associations, such as Mastercard, have promulgated rules that do not allow the merchant 12 to charge, or "capture," a transaction until the purchased goods are shipped or the purchased services are delivered. However, with respect to at least some debit card transactions, a charge may be posted at the time of the transaction. When the merchant 12 ships or delivers the goods or services, the merchant 12 captures the transaction by, for example, appropriate data entry procedures on the point-of-sale terminal. This may include bundling of approved transactions daily for standard retail purchases. If the cardholder 22 cancels a transaction before it is captured, a "void" is generated. If the cardholder 22 returns goods after the transaction has been captured, a "credit" is generated. The interchange network 16 and/or the issuer 18 stores the payment card information, such as, and without limitation, a type of merchant, a merchant identifier, a location where the transaction was completed, an amount of purchase, and a date and time of the transaction, in a transaction database 24.

After a purchase has been made, a clearing process occurs to transfer additional transaction data related to the purchase among the parties to the transaction, such as the acquirer 14, the interchange network 16, and the issuer 18. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among the merchant 12, the acquirer 14, and the issuer 18. Settlement refers to the transfer of financial data or funds among the merchant 12, the acquirer 14, and the issuer 18 related to the transaction. Usually, transactions are captured and accumulated into a "batch," which is settled as a group. More specifically, a transaction is typically settled between the issuer 18 and the interchange network 16, and then between the interchange network 16 and the acquirer 14, and then between the acquirer 14 and the merchant 12.

In some embodiments, the payment card transaction is a card present transaction conducted, for example, by swiping or dipping a payment card at the merchant's point-of-sale (POS terminal. Alternatively, the payment card transaction may be a card-not-present transaction conducted, for example, with a payment card stored on file with the merchant or stored as digital wallet data in an electronic wallet on a consumer's computing device. The interchange network 16 includes the SA component 26 that is configured to analyze various data associated with the payment card transaction and provide various information to one or more parties involved in the payment card transaction, such as the merchant 12 and the acquirer 14.

In particular, the SA component 26 is a specially programmed computer system that enables the interchange network 16 to implement an automated process to identify an account number attempting to be authorized, determine if the cardholder 22 has requested that additional authentication of the transaction be required, and transmit an authentication request message to a mobile device 40 (e.g., via a user mobile application running on the mobile device 40) of the cardholder if additional authentication is required. The cardholder mobile device 40 may be, for example, a cellular telephone, a smart watch or other electronic wearable apparel, a tablet, an implanted smart device, a personal computing device, or any other electronic device capable of two-way digital communications which may be associated with a cardholder. In some embodiments, the mobile device 40 may be replaced with another computing device suitable for performing the functions disclosed herein (e.g., a desktop or laptop computer, a smart television, etc.

The SA component 26 is specially programmed with a plurality of algorithms that are configured to read and/or extract the PAN from a payment authorization request message and process the PAN using an SA database 28 do determine if the account information associated with the PAN requires additional authentication from the cardholder 22 before processing the transaction. If additional authentication is required, the algorithms are further configured to place the transaction on hold and transmit an authentication request message to the mobile device 40 of the cardholder 22.

The mobile device 40 may, in response to the received authentication request message, receive input from a user, e.g., the consumer 22 associated with the PAN, and may transmit data to the SA component 26 via the interchange network 16. The mobile device 40 may be configured to access the SA component 26 and/or interchange network 16 via an application stored entirely or partially on the mobile device 40. The mobile device 40 may also be configured to communicate with the SA component 26 and/or interchange network 16 via one or more networks, such as the network 20, using one or more communication protocols (e.g., such as those described herein). The mobile device 40 may transmit an authentication response message based upon input received from the cardholder 22 in response to the authentication request message.

The algorithms of the SA component 26 are further configured to release the payment authorization request message for processing upon receipt of authorization from the cardholder 22 or transmit a payment authorization response message to the merchant indicating that the transaction is declined. In the example embodiment, the payment authorization request message may include at least a first data element configured to store the PAN and one or more additional elements configured to store additional transaction data.

In the exemplary embodiment, the mobile device 40 may additionally be configured to facilitate the cardholder 22 to setup an account with the SA component 26 or another component of the interchange network 16. During the account setup process, the cardholder 22 may transmit, via the mobile device 40, account registration information including, for example, and without limitation, payment account data (e.g., the PAN, a virtual payment number, limited use number, etc.) and mobile device 40 identification data (e.g., an Electronic Serial Number (ESN), Mobile Equipment Identifier (MEM), International Mobile Equipment Identity (IMEI) number, and the like).

For instance, the SA component 26 may receive account registration information from the mobile device 40 identifying the mobile device 40 and a payment account or PAN associated with the cardholder 22. The cardholder 22 may, for example, setup the account with the SA component 26 by providing the account registration information and generating a login identifier (i.e., a UserID) and a password used when logging into an application for communicating with the SA component 26. The cardholder 22 may transmit various information or data to the SA component 26 via the application, which may be stored on, partially stored on, or accessed via a web-browser of the mobile device 40. The information or data transmitted by the user to the SA component 26 may include, for example, and without limitation, setting a restriction on the cardholder's PAN requiring additional authentication of one or more transactions against the PAN before processing the transaction, biometrics of the cardholder, and/or contact information. The contact information may include one or more ways to communicate with the cardholder 22, including, for example, a push notification associated with the mobile application, a short messaging service (SMS) message, an email message, telephone number, and the like. The SA component 26 may generate a new account profile or update an existing account profile for the account associated with the account registration information received from the mobile device 40.

Figure 2:
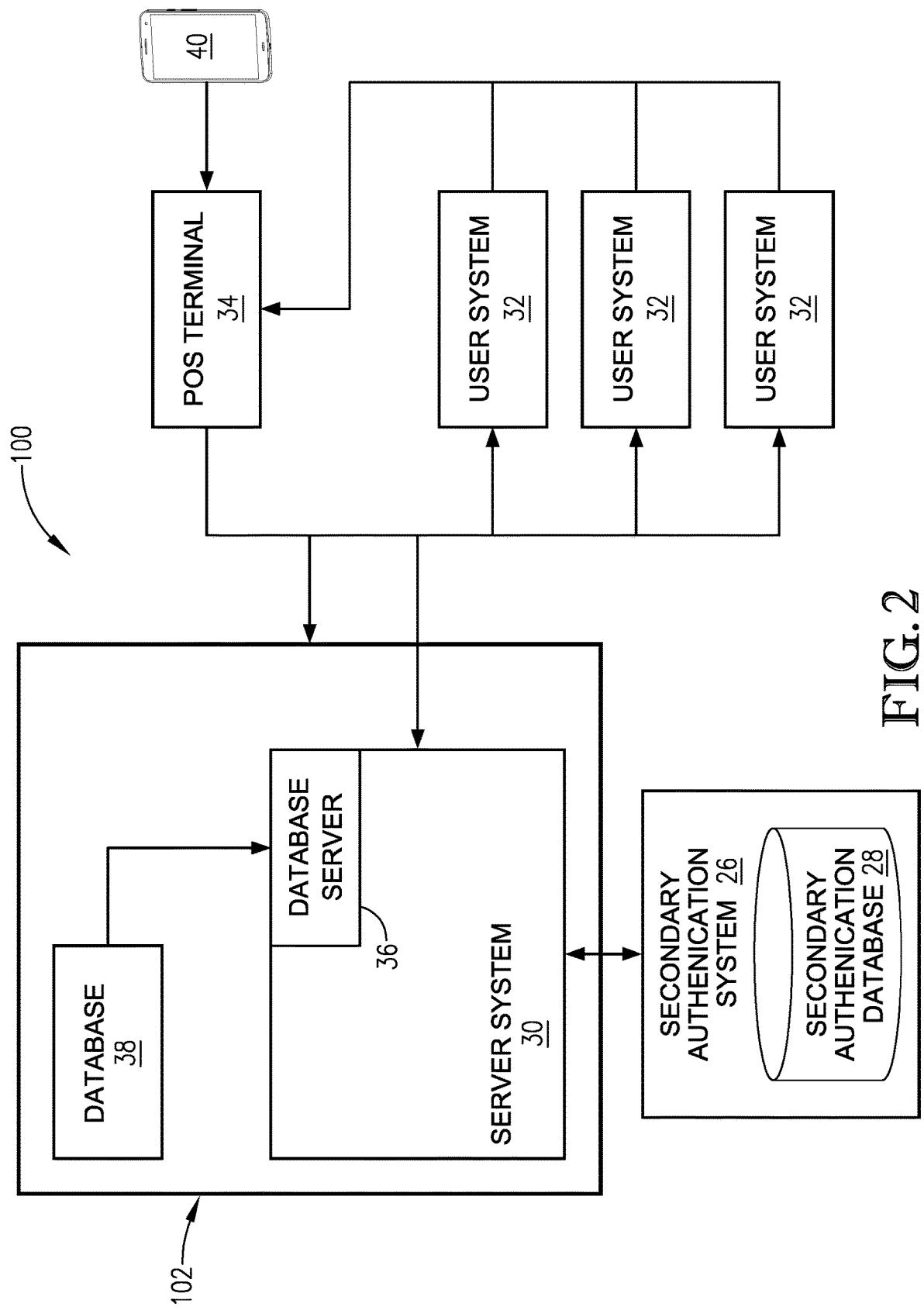
FIG. 2 is a simplified block diagram of an example transaction processing system (TPS) for requesting additional authentication of a transaction from a cardholder using the SA system shown in FIG. 1.

FIG. 2 is a simplified block diagram of an example payment network 100 including a transaction processing system (TPS) 102 for requesting additional authentication of a transaction from a cardholder using the SA component 26. In some embodiments, the payment network 100 is similar to the payment card network system 10 (shown in FIG. 1). In the example embodiment, the payment network 100 includes a plurality of computing devices connected in accordance with the present disclosure. The payment network 100 includes a server system 30 of the TPS 102 coupled in communication with a point-of-sale (POS) terminal 34 located at a merchant 12 (shown in FIG. 1), and/or other user systems 32 associated with merchants, merchant banks, payment networks, and/or issuer banks.

More specifically, in the example embodiment, the TPS 102 includes the server system 30, which may be part of the interchange network 16 (shown in FIG. 1), coupled in communication with the POS terminal 34 and the user systems 32 associated with merchants, merchant banks, payment networks, and/or issuer banks. The server system 30 is also coupled in communication with a plurality of client sub-systems, also referred to as the user systems 32. In one embodiment, the user systems 32 are computers including a web browser, such that server system 30 is accessible to the user systems 32 using the Internet. The user systems 32 are interconnected to the Internet through one or more of many interfaces including, for example, a network, such as a LAN or WAN, dial-in-connections, cable modems, and/or special high-speed integrated Services Digital Network (ISDN) lines. The user systems 32 could be any device capable of interconnecting to the Internet including an Internet connected phone, a PDA, or any other suitable web-based connectable equipment.

In the example embodiment, the TPS 102 also includes one or more POS terminals 34, which may be connected to the user systems 32 and may be connected to the server system 30. The POS terminals 34 may be interconnected to the Internet (or any other network that allows the POS terminals 34 to communicate as described herein) through many interfaces including a network, such as a local area network (LAN) or a wide area network (WAN), dial-in-connections, cable modems, wireless modems, and special high-speed ISDN lines. The POS terminals 34 are any device capable of interconnecting to the Internet and including an input device capable of reading information from a cardholder's financial payment card. In some embodiments, the POS terminal 34 may be a cardholder's personal computer, such as when conducting an online purchase through the Internet. As used herein, the terms POS device, POS terminal, and point of interaction device are used broadly, generally, and interchangeably to refer to any device in which a cardholder interacts with a merchant to complete a payment card transaction.

A database server 36 is connected to a database 38, which is configured to store information on a variety of matters, including account information indicating whether the cardholder 22 has requested additional cardholder authorization before processing transactions as described below in greater detail. In one embodiment, the database 38 is a centralized database stored on the server system 30 and can be accessed by potential users at one of the user systems 32 by logging onto the server system 30 through one of the user systems 32. In an alternative embodiment, the database 38 is stored remotely from the server system 30 and may be a distributed or non-centralized database.

In one example embodiment, the database 38 may include a single database having separated sections or partitions or may include multiple databases, each being separate from each other. The database 38 may store transaction data generated as part of sales activities and savings activities conducted over the processing network including data relating to merchants, account holders or customers, issuers, acquirers, savings amounts, savings account information, and/or purchases made. The database 38 may also store account data including at least one of a cardholder name, a cardholder address, an account number, and other account identifier. The database 38 may also store merchant data including a merchant identifier that identifies each merchant registered to use the network, and instructions for settling transactions including merchant bank account information. The database 38 may also store purchase data associated with items being purchased by a cardholder from a merchant, and authorization request data. The database 38 may also store device information, payment card information, and other data involved with processing transactions between one or more parties.

In the example embodiment, one of the user systems 32 may be associated with the acquirer 14 (shown in FIG. 1) while another one of the user systems 32 may be associated with the issuer 18 (shown in FIG. 1). The POS terminal 34 may be associated with the merchant 12 (shown in FIG. 1) or may be a computer system and/or mobile system used by a cardholder 22 making an on-line purchase or payment. The server system 30 may be associated with the interchange network 16 or a payment processor. In the example embodiment, the server system 30 is associated with a financial transaction processing network, such as the interchange network 16, and may be referred to as an interchange computer system. The server system 30 may be used for processing transaction data. In addition, the user systems 32 and the POS terminal 34 may include a computer system associated with at least one of a merchant, an online bank, a bill payment outsourcer, an acquirer bank, an acquirer processor, an issuer bank associated with a payment card, an issuer processor, a remote payment processing system, and/or a biller.

In the example embodiment, the TPS 102 is in communication with the SA component 26 and the SA database 28, which may be associated with the interchange network 16 or with an outside third party in a contractual relationship with the interchange network 16. In some embodiments, the SA component 26 and the SA database 28 are in communication with each other and may directly interact during the processing of payment card transactions. In the example embodiment, the SA component 26 reads and/or extracts PANS from payment transactions, and in particular, from payment authorization request messages, and processes the PAN to determine if the account information associated with the PAN requires additional authentication from the cardholder 22 before processing the transaction. The SA database 28 provides account information corresponding to the account associated with the payment transaction, including whether additional authentication is required before processing the transactions. In some embodiments, the SA component 26 and/or the SA database 28 are also in communication with a merchant system and/or an issuer system (e.g., the user systems 32) and/or the POS terminal 34 of the merchant. It is noted that the payment network 100 may include more, fewer, or alternative components and/or perform more, fewer, or alternative actions, including those discussed elsewhere herein.

Figure 3:
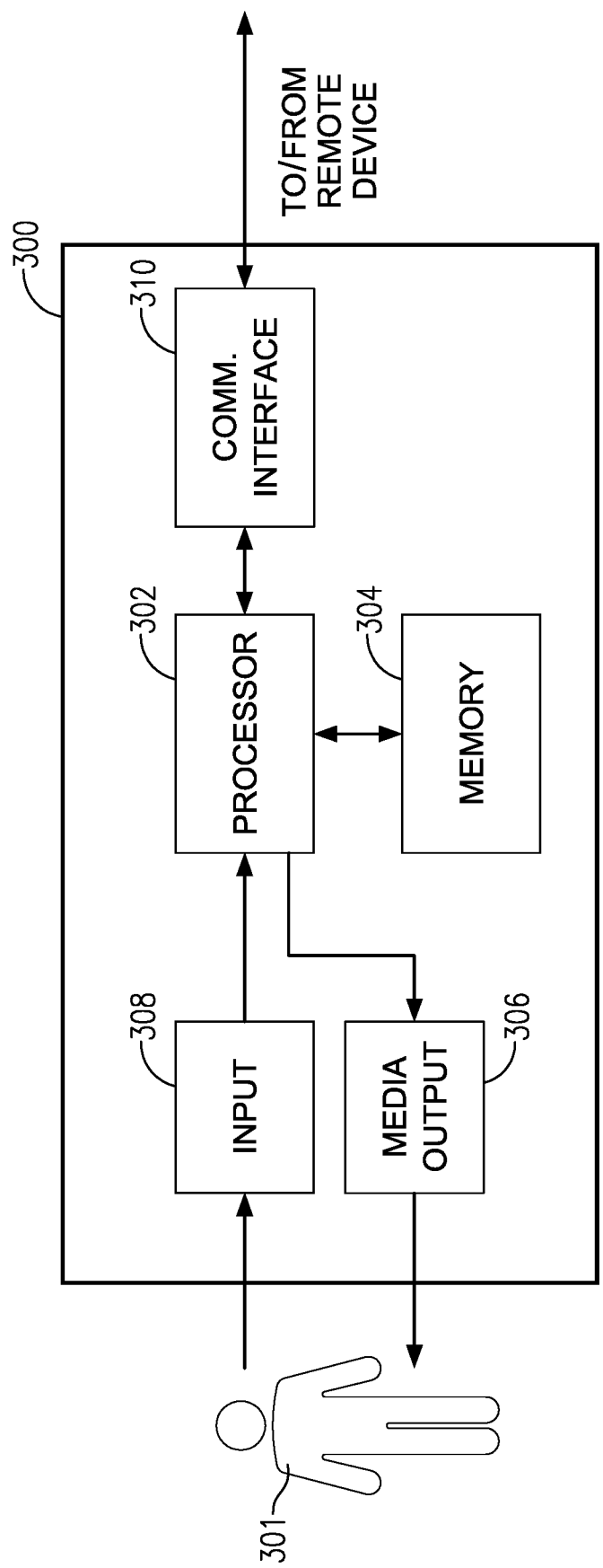
FIG. 3 is an example configuration of a user system operated by a user, such as a cardholder of the multi-party payment card network system shown in FIG. 1.

FIG. 3 is an example configuration of a user system 300 operated by a user 301, such as the cardholder 22 (shown in FIG. 1). In some embodiments, the user system 300 is a user system 32 (shown in FIG. 2), a merchant POS terminal 34 (shown in FIG. 2), and/or a mobile device 40 (shown in FIG. 1). In the example embodiment, the user system 300 includes a processor 302 for executing instructions. In some embodiments, executable instructions are stored in a memory device 304. The processor 302 includes one or more processing units, for example, a multi-core configuration. The memory device 304 is any device allowing information such as digital wallet data, executable instructions, and/or written works to be stored and retrieved. The memory device 304 includes one or more computer readable media.

A location of the user system 300 can be obtained through conventional methods, such as a location service (e.g., global positioning system (GPS) service) in the user system 300, "ping" data that includes geotemporal data, from cell location register information held by a telecommunications provider to which the user system 300 is connected, and the like. For example, in one suitable embodiment, a GPS chip can be part of or separate from the processor 302 to enable the location of the user system 300 to be determined.

The user system 300 also includes at least one media output component 306 for presenting information to the user 301. The media output component 306 is any component capable of conveying information to the user 301. In some embodiments, the media output component 306 includes an output adapter such as a video adapter and/or an audio adapter. An output adapter is operatively coupled to the processor 302 and operatively connectable to an output device such as a display device, a liquid crystal display (LCD), organic light emitting diode (OLED) display, or "electronic ink" display, or an audio output device, a speaker, or headphones.

In some embodiments, the user system 300 includes an input device 308 for receiving input from the user 301. The input device 308 may include, for example, a touch sensitive panel, a touch pad, a touch screen, a stylus, a gyroscope, an accelerometer, a position detector, a keyboard, a pointing device, a mouse, or an audio input device. A single component such as a touch screen may function as both an output device of the media output component 306 and the input device 308. The user system 300 may also include a communication interface 310, which is communicatively connectable to a remote device such as the server system 30 (shown in FIG. 2) and/or the POS terminal 34. The communication interface 310 may include, for example, a wired or wireless network adapter or a wireless data transceiver for use with Bluetooth communication, radio frequency communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 304 are, for example, computer readable instructions for providing a user interface to the user 301 via the media output component 306 and, optionally, receiving and processing input from the input device 308. A user interface may include, among other possibilities, a web browser and a client application. Web browsers enable users, such as the user 301, to display and interact with media and other information typically embedded on a web page or a website from the server system 30. A client application allows the user 301 to interact with a server application from the server system 30.

In the example embodiment, the computing device 300 is a user computing device from which the user 301 engages with a merchant (e.g., the merchant 12 shown in FIG. 1), an interchange network (e.g., the interchange network 16 shown in FIG. 1), and an issuer of a payment card (e.g., the issuer 18 shown in FIG. 1) to perform a payment transaction that undergoes an additional authentication process.

Figure 4:
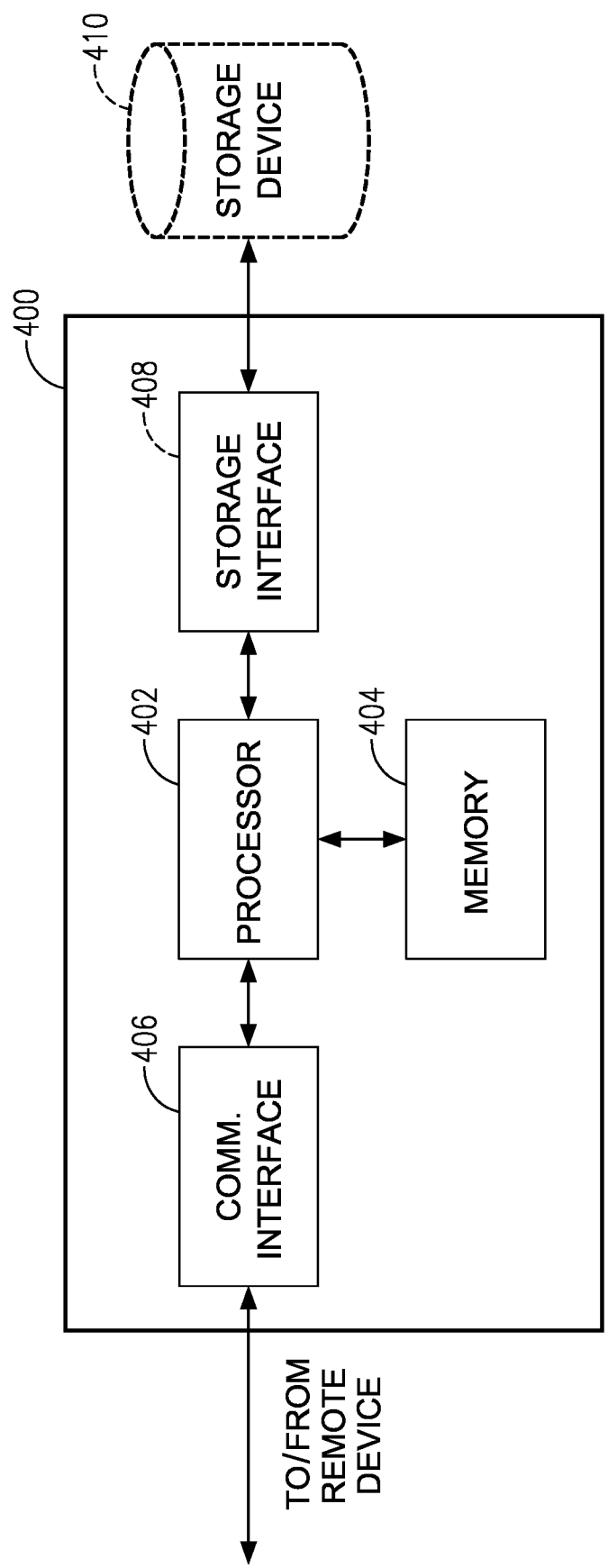
FIG. 4 is an example configuration of a server system, such as a server system for use in the TPS shown in FIG. 2.

FIG. 4 is an example configuration of a server system 400, such as the server system 30 (shown in FIG. 2). The server system 400 includes, but is not limited to, the transaction database 24 (shown in FIG. 1), the SA component 26, and/or the SA database 28. In the example embodiment, the server system 400 includes a processor 402 for executing instructions. The instructions may be stored in a memory area 404, for example. The processor 402 includes one or more processing units (e.g., in a multi-core configuration) for executing the instructions. The instructions may be executed within a variety of different operating systems on the server system 400, such as UNIX, LINUX, Microsoft Windows®, etc. More specifically, the instructions may cause various data manipulations on data stored in a storage device 410 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

The processor 402 is operatively coupled to a communication interface 406 such that the server system 400 can communicate with a remote device such as a user system 300 (shown in FIG. 3) or another server system 400. For example, the communication interface 406 may receive communications from the cardholder's mobile device 40 or a user system 32 via the Internet, as illustrated in FIG. 2.

The processor 402 is operatively coupled to the storage device 410. The storage device 410 is any computer-operated hardware suitable for storing and/or retrieving data. In some embodiments, the storage device 410 is integrated in the server system 400. In other embodiments, the storage device 410 is external to the server system 400 and is similar to the transaction database 24. For example, the server system 400 may include one or more hard disk drives as the storage device 410. In other embodiments, the storage device 410 is external to the server system 400 and may be accessed by a plurality of server systems 400. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In some embodiments, the processor 402 is operatively coupled to the storage device 410 via a storage interface 408. The storage interface 408 is any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory area 404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In the example embodiment, server system 400 is a secondary authentication processing system in communication with one or more of the acquirer 14, the issuer 18, and the merchant 12 during a payment card transaction associated with a user, such as the cardholder 22 (shown in FIG. 1). The server system 400 performs checking for account restrictions for accounts (e.g., PANs) initiating a payment transaction and provides secondary authentication services to a cardholder associated with the payment transaction.

Figure 5:
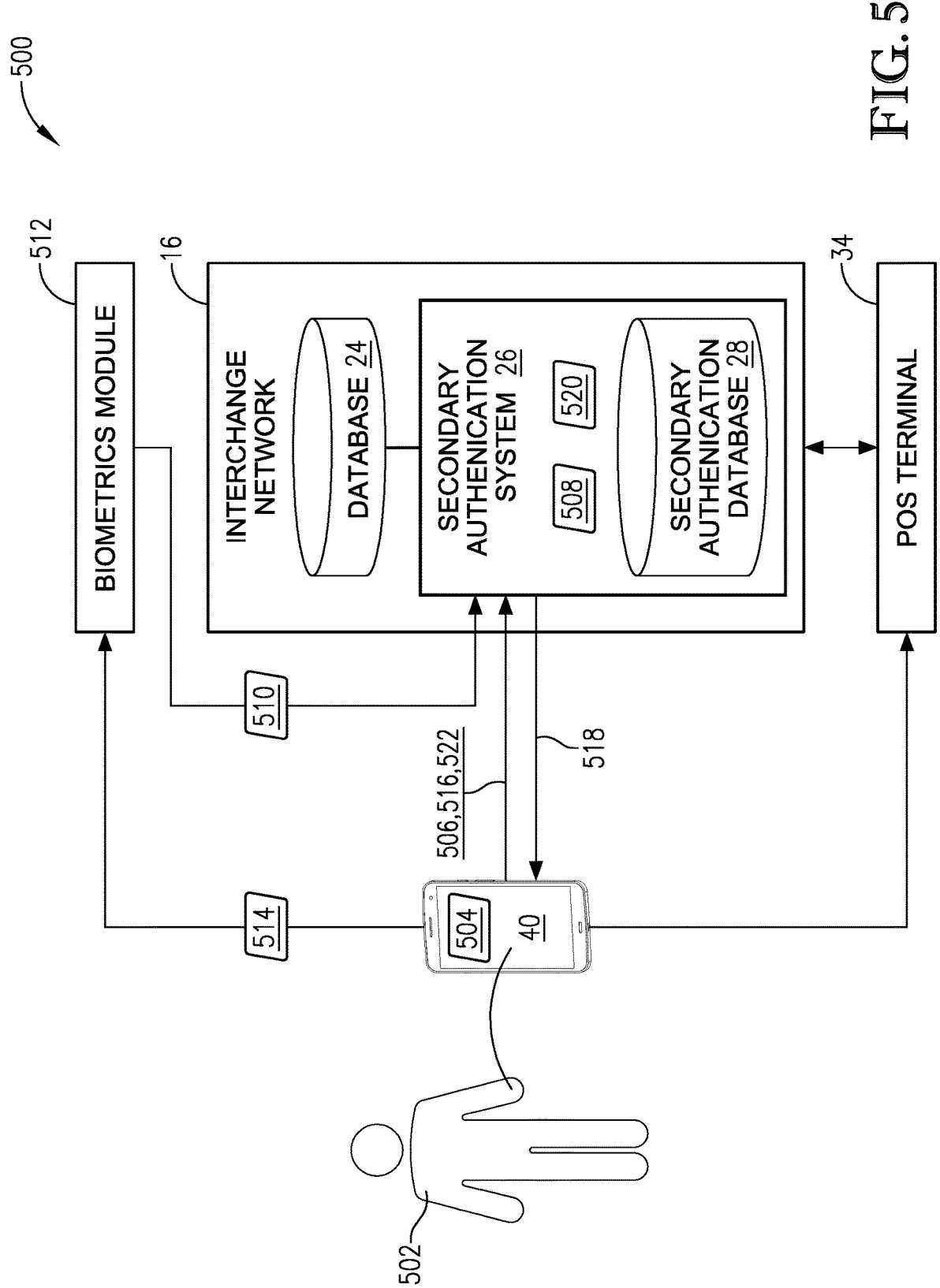
FIG. 5 is a schematic diagram showing operation of the SA system shown in FIG. 1.

FIG. 5 is a schematic diagram showing operation of a secondary authentication system 500. As described herein, the SA component 26 is configured to receive requests from a cardholder 502 to prevent processing of transactions against the cardholder's PAN 520 without first obtaining real-time secondary authentication from the cardholder. In some embodiments, the SA component 26 is also in communication with a merchant system, an issuer system (not shown), and/or the POS terminal 34 of the merchant 12. In the example embodiment, the SA component 26 is a component of a payment card network, such as payment card interchange network 16.

In the example embodiment, the SA component 26 is programmed to communicate with one or more cardholder mobile devices 40, via a secondary authentication application 504, to receive account registration information 506 to facilitate establishing an account that is not registered with the SA component 26. In particular, the account registration process creates a cardholder account and associated credentials for use with the SA component 26 and/or the secondary authentication application 504. The cardholder 502 enters the account registration information 506 for transmission to the SA component 26. The account registration information 506 may include, for example, and without limitation, payment account data, mobile device 40 identification data, setting a restriction on the cardholder's PAN 520 requiring additional authentication, biometrics of the cardholder, and/or contact information, as described herein. The account registration information 506 may be stored in the SA database 28. The SA component 26 generates a cardholder account 508 from the account registration information 506 for the cardholder 502.

Furthermore, in the example embodiment, the SA component 26 is programmed to receive a biometric profile 510 from a biometrics module 512. The biometric profile 510 may include, for example, biometrics of the cardholder 502, i.e., one or more scans or digital representations 514 of select physical features of the cardholder 502 that are to be validated during account setup and/or secondary authentication requests for transactions against the cardholder's PAN 520. The biometrics or physical features of the cardholder 502 can include, for example, and without limitation, voice recognition, fingerprints, iris features, vein patterns, facial features, or the like. The biometric profile 510 may be stored, for example, in the biometrics module 512 or the SA database 28. The SA component 26 supplements the cardholder profile 508 with the biometric profile 510. The biometrics module 512 is programmed to receive the one or more scans or digital representations 514 of physical features from the cardholder's mobile device 40 and use scans or digital representations to generate the biometric profile 510 and/or validate the one or more scans or digital representations 514 against the biometric profile 510.

Additionally, in the exemplary embodiment, the SA component 26 may communicate with the secondary authentication application 504 to send, receive, and store information related to, for example, and without limitation, secondary authentication of transactions against the cardholder's PAN 520, secondary authentication restrictions 516 set by the cardholder 502 requesting secondary authentication, notifications 518 of transactions made against the cardholder's PAN 520, etc.

In the exemplary embodiment, the cardholder 502 may establish secondary authentication restrictions 516 for the cardholder's PAN 520, as is described herein. The SA component 26 may store the secondary authentication restrictions 516 that are established by the primary cardholder 502, for example, in the SA database 28. The secondary authentication restrictions 516 may be established, for example, by the cardholder 502 turning on or off a setting in the secondary authentication application 504. The setting may involve requiring secondary authentication of particular transactions against the PAN 520 and specifying restrictions or approvals of the use of the cardholder's PAN 520. In the exemplary embodiment, the secondary authentication restrictions 516 can be based on, for example, and without limitation, time limit, spending amount, Merchant Category Codes (MCCs), merchant names, and/or other merchant identifiers. Furthermore, when the cardholder's PAN 520 is used to make a transaction at a POS terminal 34, for example, the transaction data is checked against the SA component 26 by the interchange network 16. If the SA component 26 indicates that the secondary authentication restrictions 516 require secondary authentication, the SA component 26 transmit a secondary authentication request to the cardholder 502. If the SA component 26 determines that secondary authentication is not required, the SA component 26 allows the transaction to continue processing.

In one embodiment, the secondary authentication restriction 516 may include limits based on MCCs, merchant names, other merchant identifiers, a spending limit, a time limit, and/or a geolocation limit. If the restrictions 516 indicate secondary authentication is required based on any of the limits described above, the transaction is placed on hold by the SA component 26 until secondary authentication by the cardholder 502 is completed. As such, the SA component 26 facilitates the cardholder 502 to control the processing of transactions, including the types, amounts, and locations of transactions, that can be made against the cardholder's PAN 520. Furthermore, since this is pre-fraud screening/scoring, the SA component 26 facilitates reducing fraud against the cardholder's PAN 520.

In some embodiments, the SA component 26 may send notifications 518 to the cardholder 502, for example, via the secondary authentication application 504. The notifications 518 may concern transaction attempts made against the cardholder's PAN 520. In the exemplary embodiment, the notifications 518 include information about the attempted transaction, including, for example, and without limitation, the merchant's name, the merchant's location, the transaction amount, combinations thereof, or other information. The notification may also include an authentication request message asking the cardholder 502 to provide authentication of the transaction or to decline the transaction. For example, in one embodiment, the cardholder 502 may select an approval icon display on the cardholder's mobile device 40 to authenticate the transaction. The secondary authentication application 504 may then request that the cardholder 502 provide, for example, one or more scans or digital representations 514 of physical features of the cardholder 502 to the SA component 26 via the mobile device 40 to allow processing of the transaction.

Figure 6:
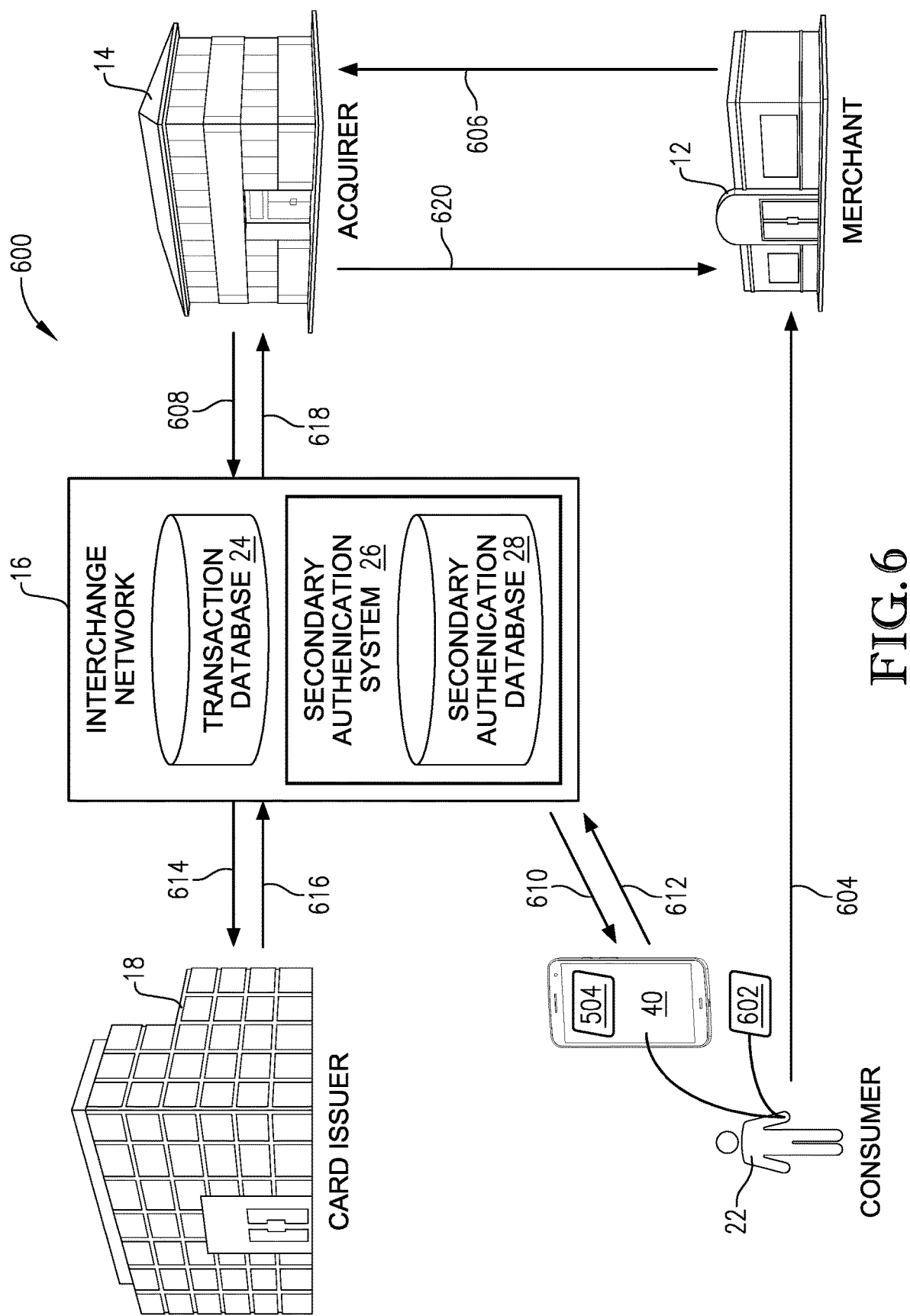
FIG. 6 is a schematic diagram of the payment card network system shown in FIG. 1, showing data flow among the parties during a payment transaction requiring secondary authentication by a cardholder.

FIG. 6 is a schematic diagram of the payment card network system 10 showing a data flow 600 among the parties during a payment transaction requiring secondary authentication by the cardholder 22. In the example embodiment, the payment transaction is a card present transaction where the cardholder 22 initiates the payment transaction using, for example, and without limitation, a physical payment card 602 to transact with the merchant 12 (shown in FIG. 1) to purchase goods and/or services associated with the merchant 12.

In the example embodiment, the merchant 12 includes a merchant computer device (not shown), such as the POS terminal 34 (shown in FIG. 2). When the cardholder 22 selects to initiate a transaction with the merchant 12, the cardholder taps, swipes, or dips the payment card 602 at the POS terminal 34 to transfer the cardholder's account information (e.g., the cardholder's PAN 520) to the POS terminal. In particular, the cardholder 22 transmits transaction data 604 to the merchant 12 via the swipe or dip of the payment card 602. In some embodiments, the cardholder 22 may transmit the transaction data 604 wirelessly via the cardholder's mobile device 40 to the merchant 12, i.e., to the POS terminal 34. The transaction data 604 may include, for example, transaction information indicating a purchased item identifier associated with the goods and/or services the cardholder 22 would like to purchase from the merchant 12 and a payment credential (e.g., the cardholder's PAN 520, digital wallet data, etc.

The merchant 12 receives the transaction data 604 and generates a payment authorization request message 606. It is noted that the messages within an interchange network such the interchange network 16, may, in at least some instances, conform to the International Organization for Standardization (ISO) Standard 8583, Financial transaction card originated messages interchange message specifications, which is the ISO standard for systems that exchange electronic transactions made by cardholders using payment cards. In the example embodiment, the payment authorization request message 606 can be an ISO 8583 message type identifier (MTI) 0100 message.

The payment authorization request message 606 (i.e., the 0100 message) transmitted to the acquirer 14 for processing and further transmission to the issuer 18 for approval. For example, the acquirer 14 communicates with and transmits the 0100 message to the interchange network 16, as indicated by arrow 608. The interchange network 16 may check the PAN associated with the 0100 message against the SA component 26 and/or SA database 28, as is described herein, to determine whether there are any associated secondary authentication restrictions 516 (shown in FIG. 5). If the cardholder 22 has set secondary authentication restriction 516 on the account, the SA component 26 places a hold on the payment authorization request message 606, for example, by interrupting the normal processing flow and storing the payment authorization request message 606 in memory, such as the database 38 (shown in FIG. 2) or the SA database 28.

The SA component 26 may may transmit a signal indicating that a notification should be sent to the cardholder 22 for authenticating the transaction. In the exemplary embodiment, the SA component 26 may transmit a secondary authentication request message 610 to the cardholder's mobile device 40, for example, via the secondary authentication application 504, for authenticating the transaction. In some embodiments, the SA component 26 may determine that the authentication request message 610 cannot be sent to the mobile device 40 (e.g., if the message timed out, etc.). In such instances, the authentication request messages 610 may be transmitted to additional devices or via additional communication modes, for example, and without limitation, to an email address associated with the cardholder 22, to a second authorized mobile device (not shown), etc. The SA component 26 may wait to receive a secondary authentication response message 612 from the cardholder 22. In instances where the cardholder 22 is unable or unwilling to respond, the SA component 26 may transmit a transaction decline code after a predetermined period has passed from the transmission of the authorization request message 610. In some suitable embodiments, the SA component 26 may be programmed to transmit a second authorization request message associated with a second predetermined period which may be the same or different than the first predetermined period. In instances where an authentication response message 612 is received, if the response message 612 indicates that the transaction is valid, the SA component 26 may then release the hold on the payment authorization request message 606 such that the interchange network 16 can forward the 0100 message to the issuer 18, as indicated by arrow 614 to determine whether the cardholder 22 is authorized to make the transaction.

The issuer 18 transmits a payment authorization response message 616 back to the interchange network 16 after approval or disapproval of the authorization request (i.e., the 0100 message). In the example embodiment, the payment authorization response message 616 can be an ISO 8583 message type identifier (MTI) 0110 message. If the issuer 18 disapproves or denies the transaction, the issuer may populate the merchant advice code portion of the payment authorization response message 616 with information as to why the transaction was disapproved. For example, if the account and/or payment card used by the cardholder 22 has been issued a new account number or expiration date, if the account has insufficient funds, or whether fraud has been detected on the account. The interchange network 16 then transmits the 0110 payment authorization response message 616 to the acquirer 14, as indicated by arrow 618.

In some embodiments, if the secondary authentication response message 612 indicates that the transaction is invalid, the SA component 26 may inject or populate a field of the payment authorization request message 606 with a decline code and transmit it to the acquirer 14 as a payment authorization response message at arrow 618. In such an instance, the issuer 18 is bypassed as there is no need for the issuer 18 to determine whether the cardholder's account is in good standing and whether the purchase is covered by the cardholder's available credit line.

The acquirer transmits the 0110 payment authorization response message to the merchant 12, as indicated by arrow 620. In the example embodiment, the merchant 12 thereafter either completes the transaction or cancels the transaction based upon the details contained in the response to the payment authorization request message 606.

Figure 7A:
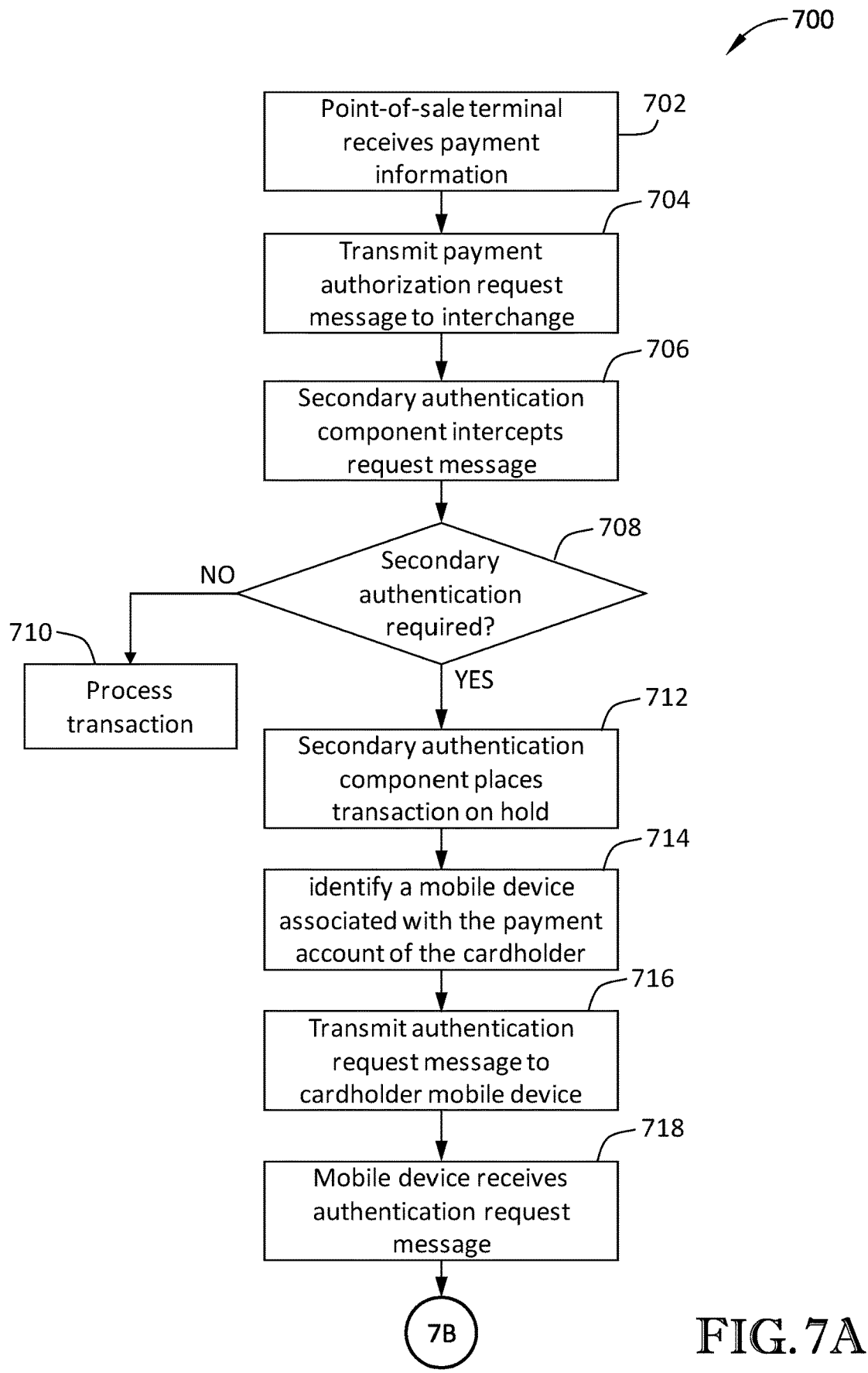
FIGS. 7A and 7B are process flow diagrams of a process for obtaining real-time cardholder authentication of payment transactions associated with a cardholder's payment card.
Figure 7B:
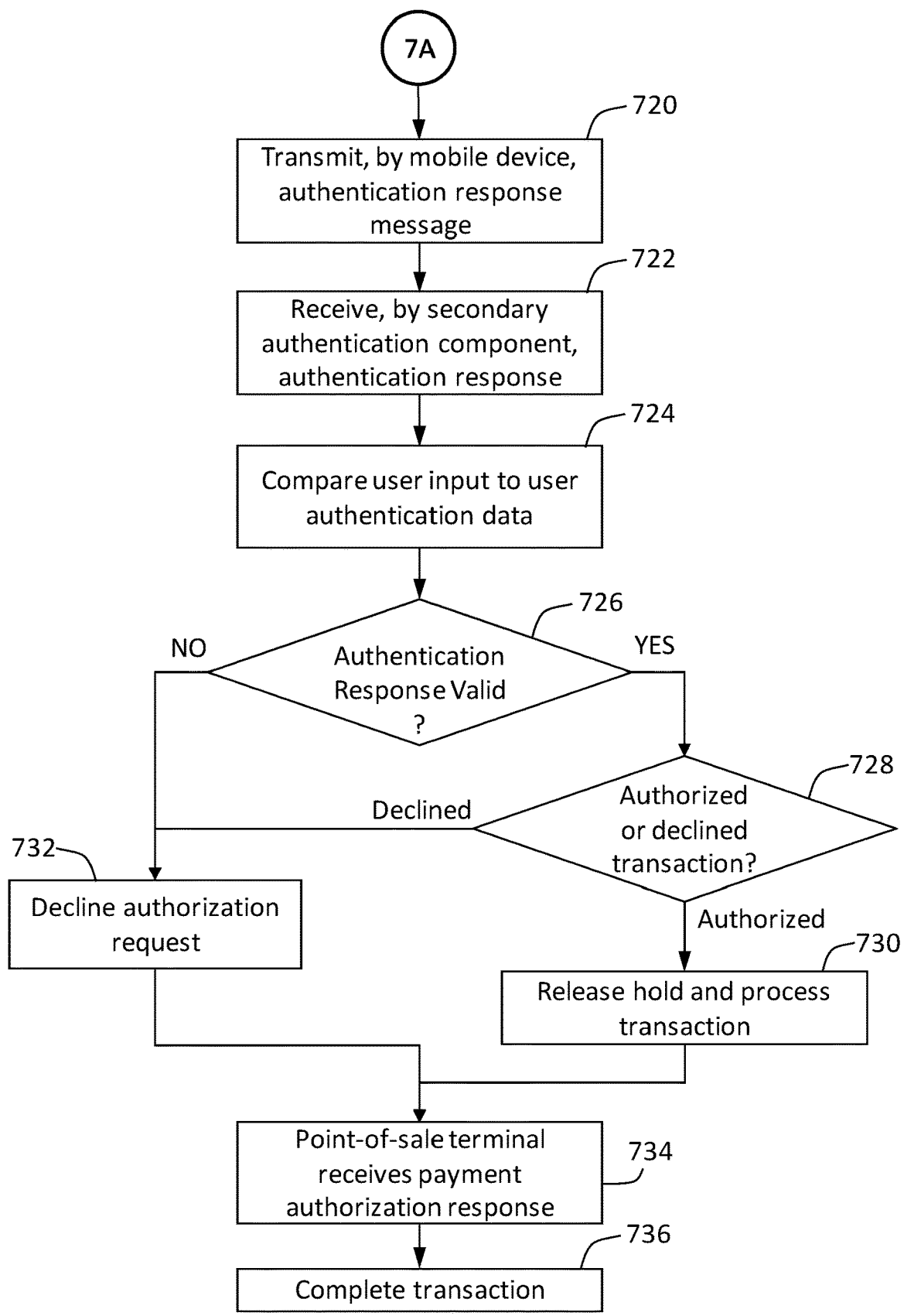

FIGS. 7A and 7B are process flow diagrams of a method 700 for obtaining real-time cardholder authentication of payment transactions associated with a cardholder's payment card. At an operation 702, a POS terminal, such as the POS terminal 34 (shown in FIG. 2), may receive payment information, such as the transaction data 604 (shown in FIG. 6), for a proposed transaction, including payment account information, such as the cardholder's PAN 520 (shown in FIG. 5), for a payment account to fund the proposed transaction (e.g., from the cardholder's payment card 602). In some examples, the POS terminal 34 may generate an authorization request, such as the payment authorization request message 606 (shown in FIG. 6), including the payment account information and additional transaction information. The POS terminal 34 may transmit the payment authorization request message 606, including the payment account information, to an interchange network, such as the interchange network 16 (shown in FIG. 1) (e.g., by way of a network, etc.) at an operation 704. The payment authorization request message 606 may include transaction data identifying the POS terminal 34 (e.g., a POS terminal identifier, a merchant ID, etc.).

At an operation 706, the SA component 26 may intercept the payment authorization request message 606. As described herein, the payment authorization request message 606 may be formatted as an ISO 8583 message type identifier (MTI) 0100 message and include at least a first data component configured to store the cardholder's PAN 520 (shown in FIG. 5) associated with the cardholder's payment account for funding the transaction. The payment authorization request message 606 may include additional data components configured to store other requisite transaction data.

At an operation 708, the SA component 26 may identify whether the transaction is required to undergo secondary authentication. For example, the SA component 26 may be configured to receive all transaction requests in real-time, prior to any fraud detection analysis by the interchange network 16 and/or the card issuer 18, over a communications network, such as the network 20 (shown in FIG. 1). The SA component 26 may assess the payment authorization request message 606 received from the POS terminal 34, for example, to determine any transaction rules set by a cardholder 22, such as to analyze whether the cardholder has requested secondary authentication of transactions. Based on the analysis of the cardholder's account, SA component 26 may identify the transaction as requiring secondary authentication. If the transaction does not require secondary authentication, the transaction may be processed by passing to the issuer 18, at an operation 710.

At an operation 712, the SA component 26 may place the transaction processing on hold. In one embodiment, the SA component 26 may insert a hold identifier or code into one of the data components of the payment authorization request message 606. Alternatively, the SA component 26 may temporarily store the payment authorization request message 606 in memory, such as in the SA database 28.

In the exemplary embodiment, at an operation 714, the SA component 26 may identify a mobile device associated with the payment account of the cardholder such as the mobile device 40. For example, the SA component 26 may analyze the account setup by the cardholder for the cardholder's mobile device 40 identification data (e.g., an Electronic Serial Number (ESN), Mobile Equipment identifier (MEM), international Mobile Equipment Identity (IMEI) number, and the like). The SA component 26 may use the identification information to communicate with the mobile device 40, as described herein.

The SA component 26 may generate an authentication request message, such as message 610 (shown in FIG. 6), to verify whether the transaction should be declined, for example for fraud. At an operation 716, the SA component 26 may transmit the authentication request message 610 to the cardholder 22, for example, via the cardholder's mobile device 40 running a user mobile application, such as the secondary authentication application 504, another user contact address, another user device, or to one or more thereof, etc. The authentication request message 610 may be transmitted by a number of communication methods as described herein and may, in some instances, be transmitted by more than one communication method (e.g., a request message may be transmitted via SMS and pushed to the secondary authentication application 504). In the exemplary embodiment, the authentication request message may be transmitted in real-time, for example, during the initiation of the transaction.

At an operation 718, the mobile device 40 and/or the secondary authentication application 504 may receive the authentication request message 610 from the SA component 26. For example, in one embodiment, the authentication request message 610 may be pushed to the mobile device 40 from the SA component 26 or another computing device server in communication with the SA component 26 (e.g., an application management server (not shown)). The authentication request message 610 may cause a notification, such as the notification 518 (shown in FIG. 5), to be displayed on the mobile device 40 (e.g., on the media output component 306 (shown in FIG. 3)) when the secondary authentication application 504 is running. In suitable embodiments, the secondary authentication application 504 may be, e.g., a credit card management application (e.g., Masterpass by Mastercard), a banking application, etc. In some embodiments, the authentication request message 610 may cause a notification 518 to be displayed on mobile device 40 even if the secondary authentication application 504 is not presently running. The notification 518 may indicate that the authentication request message 610 was received and that cardholder input may be required.

The authentication request message 610 may cause the media output component 306 (e.g., a display, touch screen, etc.) of the mobile device 40 to display an interface requesting from the cardholder 22 authentication information, such as a biometric sample, a PIN, an alphanumeric password, etc. to respond to the request message 610. In a preferred embodiment, the cardholder 22 provides a biometric sample to the SA component 26, which is authenticated by SA component 26 against the biometric sample used to setup the account (e.g., by checking against the biometric profile 510). In instances where the cardholder 22 is unable or unwilling to respond, the SA component 26 may transmit a transaction decline code after a predetermined period has passed from the transmission of the authorization request message 610. In some suitable embodiments, the SA component 26 may be programmed to transmit a second authorization request message associated with a second predetermined period which may be the same or different than the first predetermined period.

In the exemplary embodiment, in response to receipt of the authentication request message 610, the cardholder 22 may input additional data after providing the requested biometrics, PIN, alphanumeric password, etc., as described above. For example, the cardholder 22 may check a box indicating that the transaction is fraudulent. The cardholder input may be received by the secondary authentication application 504 via the mobile device 40. The secondary authentication application 504 may generate a response message, such as the authentication response message 612 (shown in FIG. 6), that may be transmitted to the SA component 26 at an operation 720. The response message may be transmitted, for example, with the authentication information provided by the cardholder. In suitable embodiments, the transmitted data may also include location information of the cardholder's mobile device 40.

The SA component 26 may receive the authentication response message 612 from the secondary authentication application 504 or the mobile device 40 at an operation 722. The authentication response message 612 may include data input by the cardholder 22 at the mobile device 40, including the authentication information, and, in some instances, geographic location data provided by the mobile device 40. The SA component 26 may compare the received cardholder input (i.e., the authentication response message 612) to previously stored cardholder authentication data at an operation 724. The cardholder authentication data may be data such as that stored in the biometric profile 510 in connection with the account setup with the SA component 26 as described herein with reference to FIG. 5.

At an operation 726, the SA component 26 may determine the validity of the authentication response message 612. For example, if a biometric sample is received and the biometric sample corresponds to the cardholder's biometric profile 510 stored in the SA database 28 and/or the biometric component 512 and associated with the cardholder, the SA component 26 may determine the transaction is authenticated. If the biometric sample and the stored biometric profile 510 do not correspond, are different, not similar, etc., the SA component 26 may determine the transaction is fraudulent.

After determining the validity of the authentication response message 612, the SA component 26 may determine whether the cardholder 22 has authorized the transaction or declined the transaction at an operation 728. At an operation 730, upon determining that the authentication response message 612 is valid and that the transaction is authorized by the cardholder, the SA component 26 may release the hold on the payment authorization request message 606 such that the interchange network 16 can forward the 0100 message to the issuer 18 to determine whether the cardholder 22 is authorized to make the transaction. Alternatively, if the authentication response message 612 is invalid and/or the transaction is declined by the cardholder 22, the SA component 26 may inject or populate a field of the payment authorization request message 606 with a decline code and transmit it to the acquirer 14 as the payment authorization response message 616 at an operation 732. In such an embodiment, the issuer 18 is bypassed as the issuer 18 is not needed to determine whether the cardholder's account is in good standing and whether the purchase is covered by the cardholder's available credit line.

At an operation 734, the POS terminal 34 may receive the payment authorization response message 616. In some instances, the payment authorization response message 616 may indicate that the transaction has been approved. In some instances (e.g., when authentication is unsuccessful or the cardholder has declined the transaction), the payment authorization response message 616 may indicate that processing of the transaction has been declined. At an operation 736, the POS terminal 34 may proceed with completing the transaction.

Figure 8A:
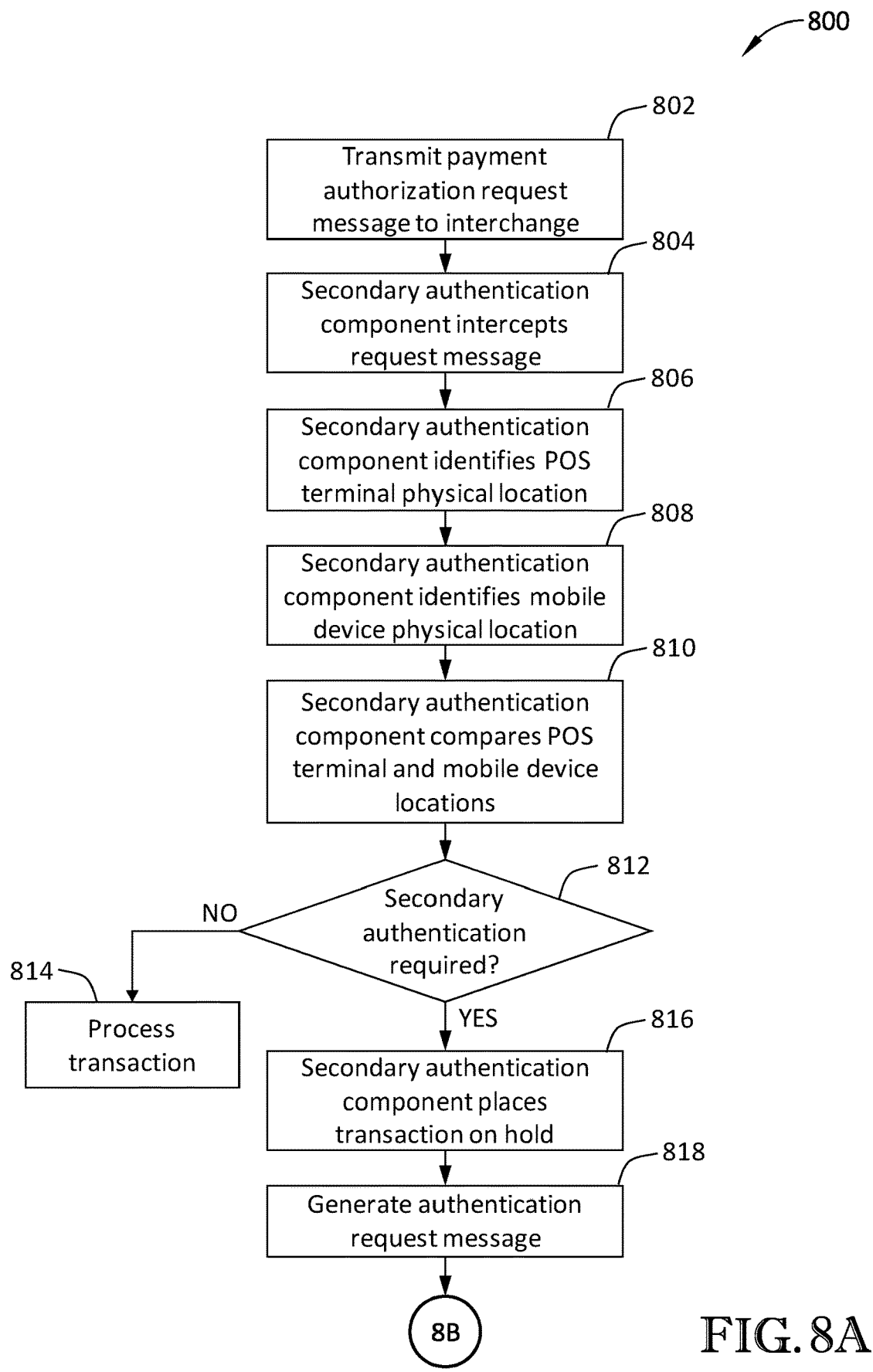
FIGS. 8A and 8B are process flow diagrams of a process for real-time cardholder authentication of payment transactions based on the cardholder's geolocation.
Figure 8B:
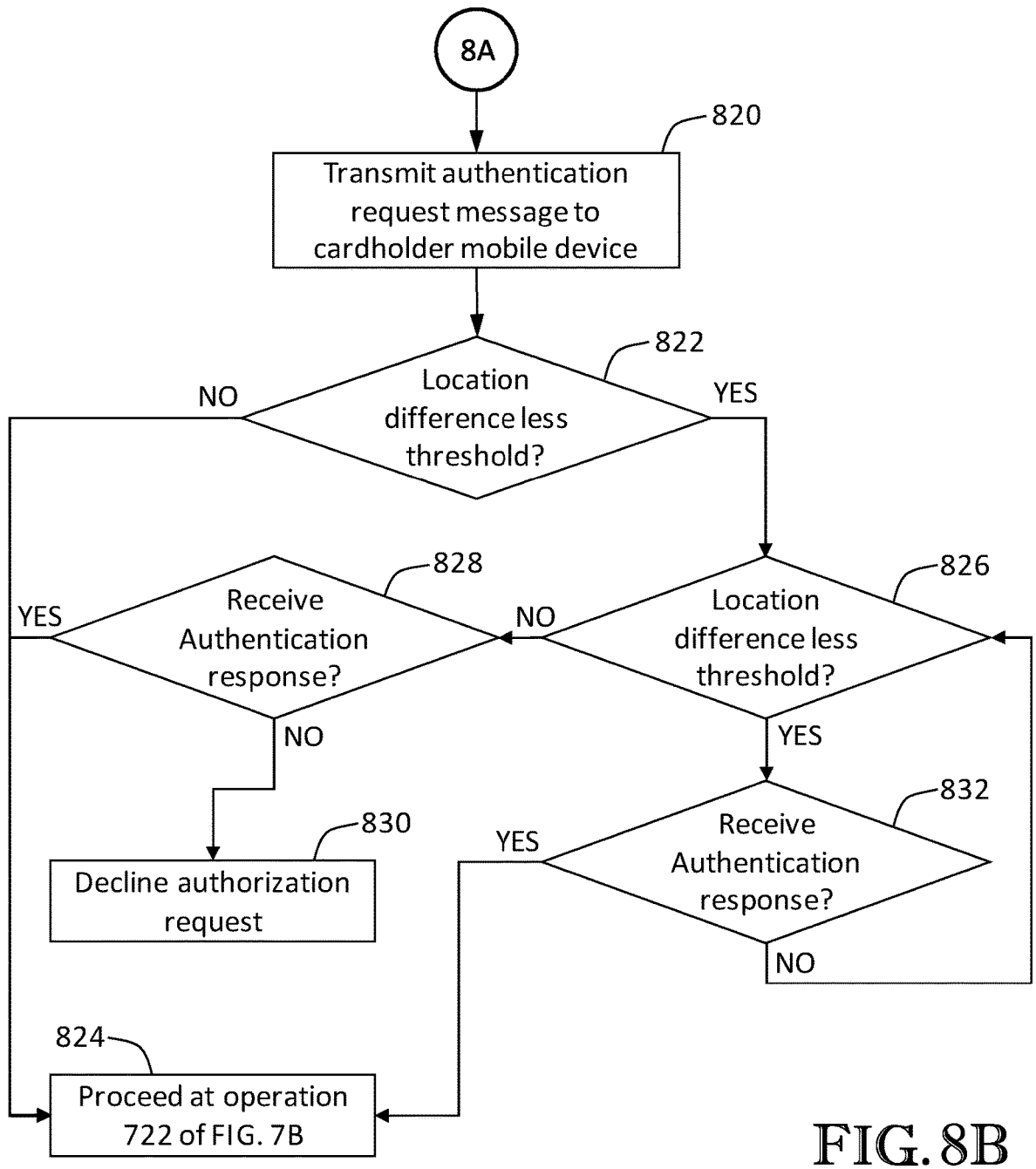

FIGS. 8A and 8B are process flow diagrams of a process 800 for real-time cardholder authentication of payment transactions based on the cardholder's geolocation. At an operation 802, a POS terminal, such as the POS terminal 34 (shown in FIG. 2), may transmit a payment authorization request message 606, including payment account information received from a cardholder, to an interchange network, such as the interchange network 16 (shown in FIG. 1) (e.g., by way of a network, etc.). The payment authorization request message 606 may include transaction data identifying the POS terminal 34 (e.g., a POS terminal identifier, a merchant ID, etc.). The payment authorization request message 606 may also include location data identifying a physical or geographic location of the POS terminal 34.

At an operation 804, the SA component 26 may intercept the payment authorization request message 606. As described herein, the payment authorization request message 606 may be formatted as an ISO 8583 message type identifier (MTI) 0100 message and include at least a first data component configured to store the cardholder's PAN 520 (shown in FIG. 5) associated with the cardholder's payment account for funding the transaction. The payment authorization request message 606 may also include location data corresponding to the POS terminal's 34 physical location. At an operation 806, the SA component 26 may identify the POS terminal's physical location based on the received payment authorization request message 606.

At an operation 808, the SA component 26 may identify a location of the cardholder's mobile device 40, for example, by requesting location data via the secondary authentication application 504. The location can be determined through a location service associated with the mobile device 40, via GPS data received from the mobile device, or other means.

At an operation 810, the SA component 26 may compare the identified location of the cardholder's mobile device 40 (based on the GPS location data received from the cardholder's mobile device) to the identified location of the payment card transaction or payment request (based on the location of the POS terminal 34). The SA component 26 may determine whether the difference in the identified location of the cardholder's mobile device 40 and the identified location of the payment card transaction (based on the location of the POS terminal 34) is below a predefined threshold distance and may use this determination as one or several indicators in a fraud modeling process.

In addition, at an operation 812, the SA component 26 may identify whether the transaction is required to undergo secondary authentication. For example, the SA component 26 may be configured to receive all transaction requests in real-time, prior to any fraud detection analysis by the interchange network 16 and/or the card issuer 18, over a communications network, such as the network 20 (shown in FIG. 1). The SA component 26 may assess the payment authorization request message 606 received from the POS terminal 34, for example, to determine any transaction rules set by a cardholder 22, such as to analyze whether the cardholder has requested secondary authentication of transactions. Based on the analysis of the cardholder's account, SA component 26 may identify the transaction as requiring secondary authentication. If the transaction does not require secondary authentication, the transaction may be processed by passing the transaction to the issuer 18, as indicated at operation 814.

If the transaction does require secondary authentication, at an operation 816 the SA component 26 may place the transaction processing on hold. In one embodiment, the SA component 26 may insert a hold identifier or code into one of the data components of the payment authorization request message 606. Alternatively, the SA component 26 may temporarily store the payment authorization request message 606 in memory, such as in the SA database 28.

In the exemplary embodiment, at an operation 818, the SA component 26 may generate an authentication request message, such as message 610 (shown in FIG. 6), to verify whether the transaction should be declined, for example for fraud.

At an operation 820, the authentication request message 610 may be transmitted to the cardholder 22, for example, via the cardholder's mobile device 40 running a user mobile application, such as the secondary authentication application 504, another user contact address, another user device, or to one or more thereof, etc. The authentication request message 610 may be transmitted, by a number of communication methods as described herein and may, in some instances, be transmitted by more than one communication method (e.g., a request message may be transmitted via SMS and pushed to the secondary authentication application 504). In the exemplary embodiment, the authentication request message may be transmitted in real-time, for example, during the initiation of the transaction.

At an operation 822, the SA component 26 may initially determine whether the difference in the identified location of the cardholder's mobile device 40 and the identified location of the payment card transaction (based on the location of the POS terminal 34) is below a predefined threshold distance. If the distance is not below the predefined threshold, the SA component 26 may wait for an authentication response from the mobile device 40 and, at operation 824 may continue the real-time cardholder authentication process at operation 722 (shown in FIG. 7B), as described herein.

If the distance is below the predefined threshold, at operation 826, the SA component 26 may continue to determine whether the difference in the identified location of the cardholder's mobile device 40 and the identified location of the payment card transaction (based on the location of the POS terminal 34) is below the predefined threshold distance. If the distance changes and exceeds the predefined threshold, the SA component 26 may determine whether an authentication response message 612 was received from the mobile device 40 at an operation 828. If an authentication response message 612 was received, the SA component 26 may continue the real-time cardholder authentication process at operation 722 (shown in FIG. 7B), as described herein, as indicated at operation 824. If an authentication response message 612 has not been received, at an operation 830 the SA component 26 may inject or populate a field of the payment authorization request message 606 with a decline code and transmit it to the acquirer 14 as the payment authorization response message 616.

At operation 826, if the distance remains below the predefined threshold, the SA component 26 may determine whether an authentication response message 612 was received from the mobile device 40 at an operation 832. If an authentication response message 612 was received, the SA component 26 may continue the real-time cardholder authentication process at operation 722 (shown in FIG. 7B), as described herein, as indicated at operation 824. Otherwise, the process continues to monitor the distance as operation 826.

Any actions, functions, operations, and the like recited herein may be performed in the order shown in the figures and/or described above or may be performed in a different order. Furthermore, some operations may be performed concurrently as opposed to sequentially. Although the computer-implemented method is described above, for the purpose of illustration, as being executed by an example system and/or example physical elements, it will be understood that the performance of any one or more of such actions may be differently distributed without departing from the spirit of the present invention.

A computer-readable storage media or medium comprising a non-transitory medium may include an executable computer program stored thereon and for instructing one or more processing elements to perform some or all the operations described herein, including some or all of the operations of the computer-implemented method. The computer program stored on the computer-readable medium may instruct the processor and/or other components of the system to perform additional, fewer, or alternative operations, including those discussed elsewhere herein.

All terms and phrases used herein are to be broadly interpreted unless otherwise stated. For example, the phrases "transaction card," "payment card," and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

The terms "processor," "processing element," and the like, as used herein, may, unless otherwise stated, broadly refer to any programmable system including systems using central processing units, microprocessors, microcontrollers, reduced instruction set circuits (RISC), application specific integrated circuits (ASIC), logic circuits, and any other circuit or processor capable of executing the functions described herein. The above examples are example only and are thus not intended to limit in any way the definition and/or meaning of the term "processor." In particular, a "processor" may include one or more processors individually or collectively performing the described operations. In addition, the terms "software," "computer program," and the like, may, unless otherwise stated, broadly refer to any executable code stored in memory for execution on mobile devices, clusters, personal computers, workstations, clients, servers, and a processor or wherein the memory includes read-only memory (ROM), electronic programmable read-only memory (EPROM), random access memory (RAM), erasable electronic programmable read-only memory (EEPROM), and non-volatile RAM (NVRAM) memory. The above memory types are example only and are thus not limiting as to the types of memory usable for storage of a computer program.

The terms "computer," "computing device," "computer system," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "network," "communications network," and the like, as used herein, may, unless otherwise stated, broadly refer to substantially any suitable technology for facilitating communications (e.g., GSM, CDMA, TDMA, WCDMA, LTE, EDGE, OFDM, GPRS, EV-DO, UWB, WiFi, IEEE 802 including Ethernet, WiMAX, and/or others), including supporting various local area networks (LANs), personal area networks (PAN), or short-range communications protocols.

The term "communication component," "communication interface," and the like, as used herein, may, unless otherwise stated, broadly refer to substantially any suitable technology for facilitating communications, and may include one or more transceivers (e.g., WWAN, WLAN, and/or WPAN transceivers) functioning in accordance with IEEE standards, 3GPP standards, or other standards, and configured to receive and transmit signals via a communications network.

The term "memory area," "storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A secondary authentication system for obtaining real-time cardholder authentication of a payment transaction associated with a cardholder's payment card, the secondary authentication system being a component of an interchange network, said secondary authentication system comprising:
   a memory device for storing data; and
   a processor communicatively coupled to said memory device, said processor programmed to:
      receive from a secondary authentication application executing on a mobile device associated with a cardholder:
         account registration information, the account registration information including a primary account number corresponding to a payment account of the cardholder and mobile device identification data corresponding to the mobile device;
         account credentials comprising a login identifier and a password;

a biometric profile of the cardholder, the biometric profile including a digital representation of a select physical feature of the cardholder; and
a secondary authentication restriction;
generate a new cardholder account, the new cardholder account including the account registration information, the account credentials, and the secondary authentication restriction;
store the new cardholder account and the biometric profile on the memory device;
intercept a payment authorization request message intended for the interchange network, the payment authorization request message transmitted by a point-of-sale terminal associated with a merchant, the payment authorization request message including the primary account number corresponding to the payment account of the cardholder;
compare the primary account number from the payment authorization request message to the new cardholder account;
based on the comparison, determine that the payment transaction requires secondary authentication based on the secondary authentication restriction;
based on the determination that the payment transaction requires secondary authentication, placing the payment authorization request message on hold, comprising:
interrupting a normal transaction process; and
storing the payment authorization request message in the memory device;
identify the mobile device associated with the new cardholder account based on the mobile device identification data;
transmit an authentication request message to the secondary authentication application executing on the identified mobile device;
receive from the secondary authentication application executing on the mobile device an authentication response message including a biometric sample of the select physical feature of the cardholder;
determine that the biometric sample corresponds to the biometric profile of the cardholder;
based on the determination that the biometric sample corresponds to the biometric profile of the cardholder, release the hold on the payment authorization request message; and
forward the payment authorization request message to the interchange network such that the interchange network forwards the payment authorization request message to an issuer associated with the primary account number.

2. The secondary authentication system in accordance with claim 1,
said processor programmed to transmit the payment authorization request message to an issuer upon receipt of the authentication response message being indicative that the payment transaction is authorized.

3. The secondary authentication system in accordance with claim 1,
said transmitting the authentication request message to the identified mobile device comprises said processor programmed to push the authentication request message to a secondary authentication application at least partially installed on the mobile device,
the authentication request message causing the mobile device to display a notification indicating that the authentication request message is received.

4. The secondary authentication system in accordance with claim 1,
said processor programmed to determine whether the authentication response message is valid or invalid.

5. The secondary authentication system in accordance with claim 4,
said processor programmed to, upon determining that the authentication response message is valid, determine whether the cardholder authorized the payment transaction or declined the payment transaction.

6. The secondary authentication system in accordance with claim 5,
wherein the step of releasing the hold on the payment authorization request message is further based, upon determining that the cardholder authorized the payment transaction.

7. The secondary authentication system in accordance with claim 1, wherein the authentication request message causes the mobile device to request authentication information from the cardholder, the authentication response message including the authentication information.

8. The secondary authentication system in accordance with claim 7, wherein the authentication information includes one or more of a personal identification number and an alphanumeric password.

9. The secondary authentication system in accordance with claim 7,
said processor programmed to compare the received authentication information in the authentication response message to cardholder authentication data.

10. A method for obtaining real-time cardholder authentication of a payment transaction associated with a cardholder's payment card, said method being performed by a secondary authentication system including a processor and a memory device, the secondary authentication system being a component of an interchange network, said method comprising:
receiving, by the processor, from a secondary authentication application executing on a mobile device associated with a cardholder:
account registration information, the account registration information including a primary account number corresponding to a payment account of the cardholder and mobile device identification data corresponding to the mobile device;
account credentials comprising a login identifier and a password;
a biometric profile of the cardholder, the biometric profile including a digital representation of a select physical feature of the cardholder; and
a secondary authentication restriction;
generating, by the processor, a new cardholder account, the new cardholder account including the account registration information, account credentials, and the secondary authentication restriction;
storing, by the processor, the new cardholder account and the biometric profile on the memory device;
intercepting, by the processor, a payment authorization request message intended for the interchange network, the payment authorization request message transmitted by a point-of-sale terminal associated with a merchant, the payment authorization request message including the primary account number corresponding to the payment account of the cardholder;
comparing, by the processor, the primary account number from the payment authorization request message to the new cardholder account;

based on the comparison, determining, by the processor, that the payment transaction requires secondary authentication based on the secondary authentication restriction;

based on the determination that the payment transaction requires secondary authentication, placing, by the processor, the payment authorization request message on hold, comprising:

interrupting a normal transaction process; and storing the payment authorization request message in the memory device;

identifying, by the processor, the mobile device associated with the new cardholder account based on the mobile device identification data;

transmitting, by the processor, an authentication request message to the secondary authentication application executing on the identified mobile device;

receiving, by the processor, from the secondary authentication application executing on the mobile device an authentication response message including a biometric sample of the select physical feature of the cardholder;

determining, by the processor, that the biometric sample corresponds to the biometric profile of the cardholder:

based on the determination that the biometric sample corresponds to the biometric profile of the cardholder, releasing the hold on the payment authorization request message; and forwarding the payment authorization request message to the interchange network such that the interchange network forwards the payment authorization request message to an issuer associated with the primary account number.

11. The method in accordance with claim 10 further comprising transmitting the payment authorization request message to an issuer upon receipt of the authentication response message being indicative that the payment transaction is authorized.

12. The method in accordance with claim 10, wherein transmitting the authentication request message to the identified mobile device comprises pushing the authentication request message to a secondary authentication application installed at least partially on the mobile device, the authentication request message causing the mobile device to display a notification indicating that the authentication request message is received.

13. The method in accordance with claim 10 further comprising determining whether the authentication response message is valid or invalid.

14. The method in accordance with claim 13 further comprising, upon determining that the authentication response message is valid, determining whether the cardholder authorized the payment transaction or declined the payment transaction.

15. The method in accordance with claim 14, wherein releasing the hold on the payment authorization request message is further based upon determining that the cardholder authorized the payment transaction.

\* \* \* \* \*